Sept. 2, 1958 M. DRU 2,850,112
APPARATUS FOR FILTERING GAS
Filed Dec. 13, 1957 4 Sheets-Sheet 1

INVENTOR
MARCEL DRU
BY Adams + Bush
ATTORNEYS

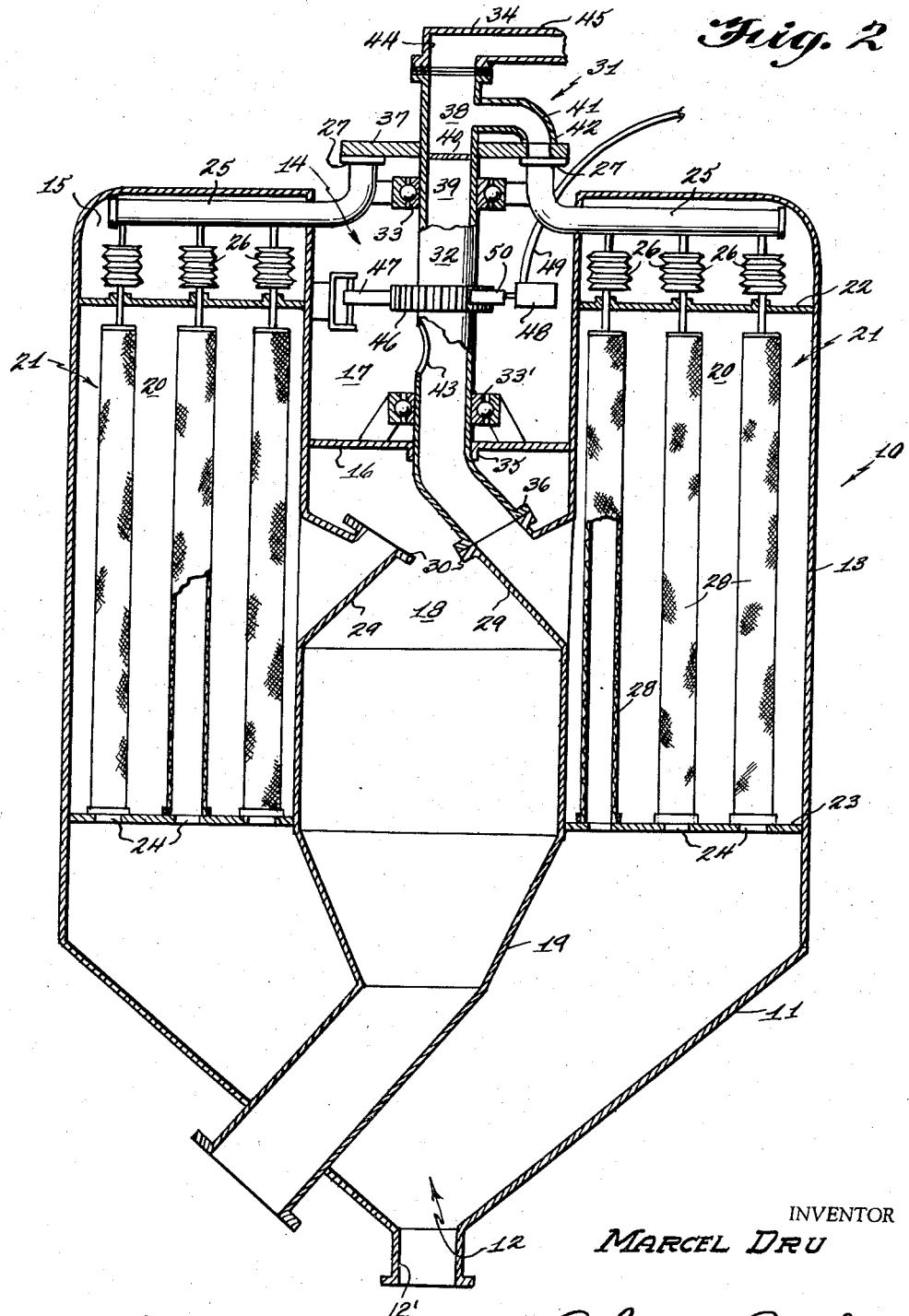

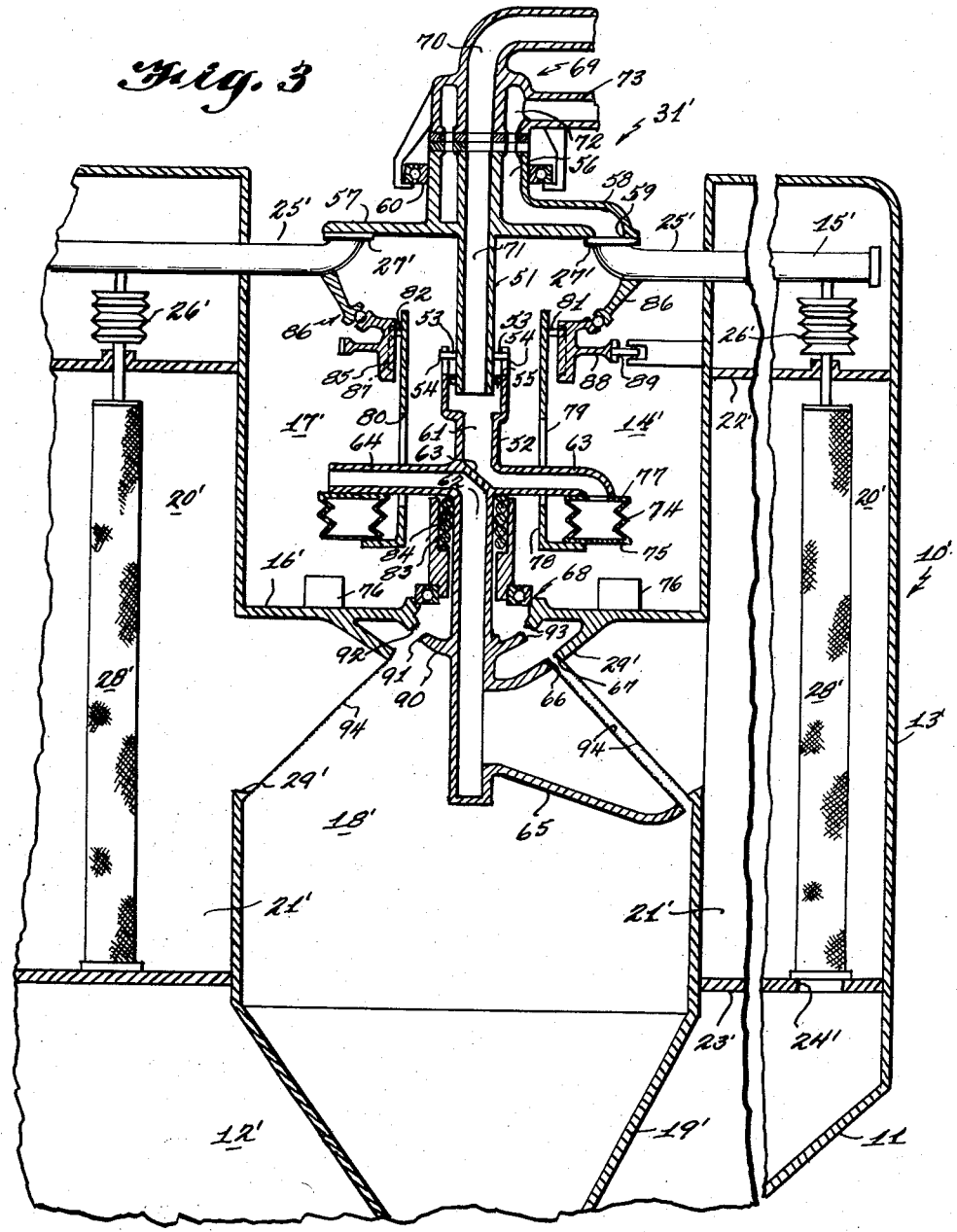

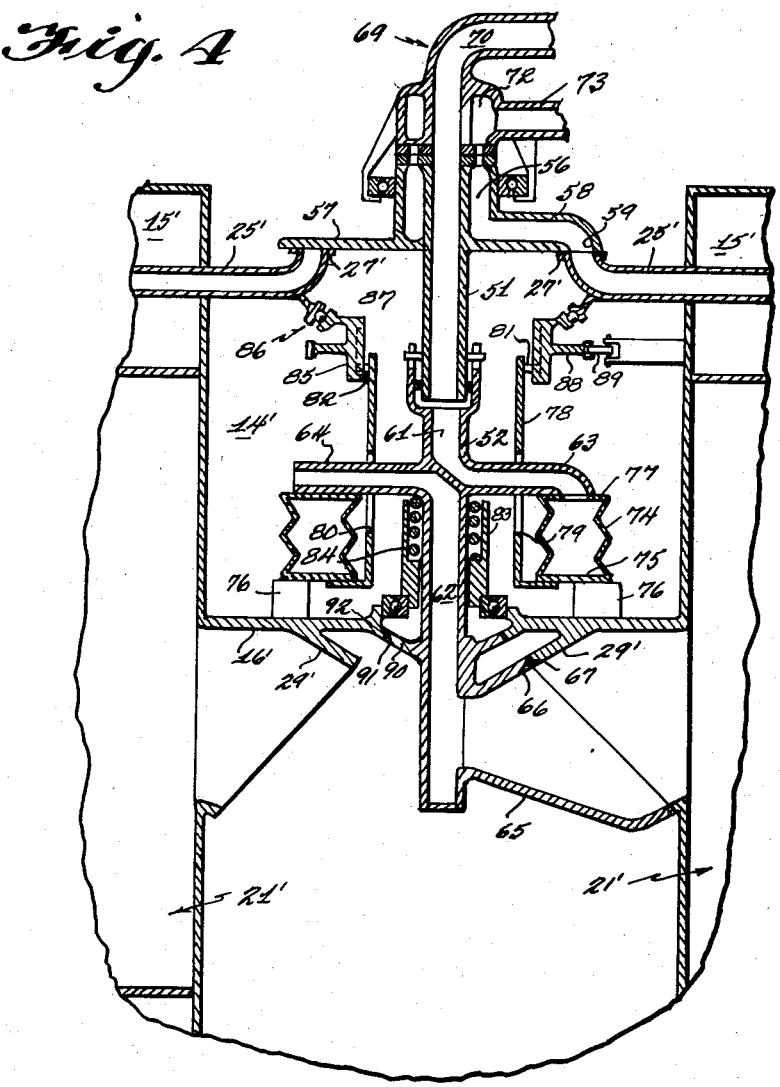

2,850,112

APPARATUS FOR FILTERING GAS

Marcel Dru, Fontainebleau, France, assignor to Preparation Industrielle des Combustibles, Fontainebleau, France, a French company Application December 13, 1957, Serial No. 702,602

11 Claims. (Cl. 183—58)

This invention relates to filtering apparatus and has more particular reference to appartus for filtering fluids such as dust-laden gas and the like.

One object of the present invention is to provide a novel and improved apparatus for filtering fluids such as dust-laden gas and the like.

Another object of the invention is to provide filter apparatus, as characterized above, comprising a plurality of filter compartments, each having a plurality of elongated flexible permeable filter sleeves mounted therein; means including conduits for directing a flow of the fluid to be treated through the filter sleeves in the filter compartments; and means for periodically and successively shaking the filter sleeves in each of the filter compartments.

Another object of the invention is to provide filter apparatus, as characterized above, wherein the means for shaking the filter sleeves includes means for creating a reverse flow of fluid through the sleeves being shaken.

A further object of the invention is to provide filter apparatus, as characterized above, wherein the filter compartments are arranged in a circle and wherein the means for shaking the sleeves and reversing the flow of fluid therethrough is in the form of a single rotatable distributor assembly located centrally with respect to the filter compartments and includes means for intermittent rotation of the assembly.

Other objects and advantages of the invention will appear in the following specification when considered in connection with the accompanying drawings, wherein:

Fig. 2 is a vertical sectional view of the apparatus shown in Fig. 1;

Fig. 3 is a view similar to that shown in Fig. 2, but with parts broken away and showing a modified form of the distributor assembly;

Fig. 4 is a view similar to that shown in Fig. 3, but with parts broken away and showing a different position of the distributor assembly.

The present invention provides novel and improved apparatus for filtering fluids and, in general, comprises a plurality of filter compartments arranged in a circle, with each compartment having a plurality of elongated flexible permeable filter sleeves mounted therein and provided with means for directing a flow of the fluid to be treated through the sleeves and a single rotatable distributor assembly located centrally with respect to the filter compartments and including means for periodically and in sequence shaking all of the sleeves in one of the filter compartments and causing a reversal of the flow of the fluid through the filter sleeves. The apparatus is particularly adapted for filtering dust-laden gas.

Figure 1:
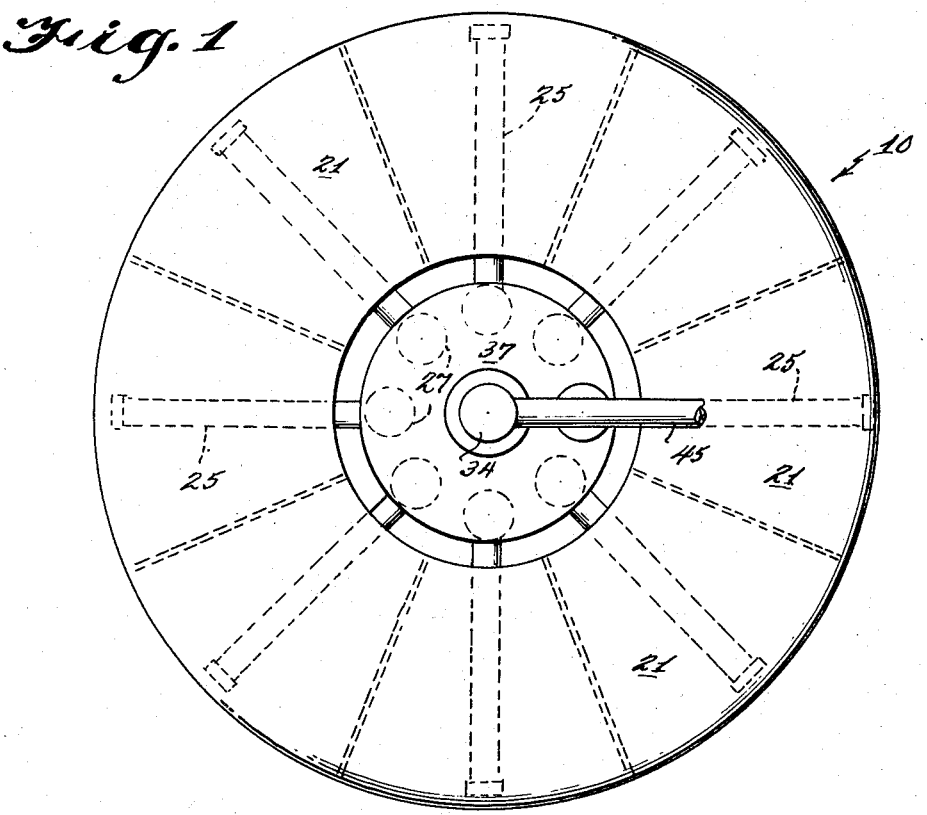
Fig. 1 is a diagrammatic plan view of one embodiment of filter apparatus constructed in accordance with the present invention.

Referring now to the drawings, there is diagrammatically illustrated, in Figs. 1 and 2, one embodiment of a fluid filter constructed in accordance with the present invention.

As there shown, the filter comprises an upright hollow body, indicated generally at 10, having a generally funnel-shaped lower portion 11 forming a receiving chamber 12 provided with a suitable inlet opening 12' for the gas to be filtered, and a cylindrical upper portion 13 divided into an open-ended central cylindrical chamber 14 and a closed-ended annular chamber 15 encircling the central cylindrical chamber 14; a transverse partition wall 16 dividing the central cylindrical chamber 14 into an upper chamber 17, open at its top to the atmosphere, and a lower chamber 18 having its open bottom end connected to a conduit 19 extending through the funnel-shaped portion 11 of the body 10 and connected to a suitable suction blower (not shown); a plurality of radial partition walls 20 dividing the annular chamber 15 into a plurality of axially extending filter compartments 21, with each compartment having vertically spaced transverse partitions 22, 23 therein forming the top and bottom walls, respectively, of the compartment and with the bottom wall 23 provided with a plurality of circular openings 24; a plurality of manifold pipes 25, each extending above the top wall 22 in one of the filter compartments 21 and carrying a plurality of bellows 26 whose top walls are fixedly connected to the manifold pipe as by suitable tubular members providing communication therewith, the manifold pipes having their inner ends closed and their outer inlet ends extending outward into the central cylindrical member 14 with their end portions turned up and with their flanged orifices 27 arranged in a circle about the vertical axis of the central cylindrical chamber 14; a plurality of elongated tubular, flexible, permeable sleeves 28 having closed tops and open bottoms, mounted in each of the filter compartments 21, each with its open bottom end fixedly connected to the bottom wall 23 of the compartment, with its axial opening in alignment with one of the openings 24 in the bottom wall and with its closed upper end connected to the movable bottom end of one of the bellows 26, as by a rod extending upwardly through an opening in the top wall 22 of the compartment; a plurality of suction conduits 29, each connected to one of the filter compartments 21 and extending outwardly and upwardly into the lower chamber 18 of the central cylindrical chamber 14 and with their flanged orifices 30 in their outer ends arranged in a circle about the vertical axis of the central cylindrical chamber 14, and a distributor assembly, indicated generally at 31, mounted in the central cylindrical chamber 14 of the body 10 for controlling the shaking of the sleeves and the reversal of the gaseous currents therethrough in the compartments during the "shaking" phase of operation.

In this particular embodiment of the invention, the distributor assembly 31 is shown as comprising a rotatable, elongated, open-ended tubular member 32 mounted within the central cylindrical chamber 14 of the body 10 and supported therein, as by suitable vertically spaced bearings 33, 33', for rotation about a vertical axis coinciding with the vertical axis of the cylindrical chamber 14 and a hollow fixed distributor head member 34 mounted on the open upper end of the tubular member 32 and supported for relative rotary engagement therewith by suitable bearings.

The lower portion of the tubular member 32 projects downwardly through a stuffing box 35 formed in the transverse partition wall 16 formed in the central cylindrical chamber 14 and its open bottom end portion is bent outwardly so that its flanged orifice 36 may be successively brought into sliding sealing engagement with the flanged orifices 30 of the suction conduits 29 connected to the filter compartments 21 and provide communication therebetween.

The upper portion of the tubular member 32 projects above the top of the body 10 and is provided with an integral circular lateral flange 37 positioned to slidably engage and seal the flanged orifices 27 in the manifold pipes 25.

The hollow interior of the tubular member 32 is divided into an upper chamber 38 and a lower chamber 39 by means of a transverse partition 40, the upper chamber 38 communicating with the hollow interior of the fixed distributor head 34. A pipe 41 connected to the upper chamber 38 has its outlet end fitted in a circular opening 42 formed in the circular flange 37 and positioned to be brought into successive communicative engagement with the orifices 27 in the manifold pipes 25.

The lower chamber 39 in the tubular member 32 has an opening 43 formed therein, opening into the space within the central cylindrical chamber 14 and thus to the atmosphere.

The fixed distributor head 34 mounted on the upper end of the tubular member 32 is shown as having a cylindrical chamber 44 formed therein communicating with the upper chamber 38 in the tubular member 32 and the chamber 44 is connected to a suitable source of pulsated air (not shown) by a pipe line 45.

Suitable means are provided for intermittently rotating the tubular member 32 to successively bring the opening 42 in the circular flange 37 into communication with the inlet orifices 27 of the manifold pipes 25 and the orifice 36 in the outwardly bent end of the tubular member 32 in communication with the orifices 30 in the suction conduits 29. In this particular embodiment of the invention, such means are shown as comprising a toothed wheel 46 fixedly mounted on the tubular member 32; a pawl-like latch member 47 engaging the teeth of the wheel 46 for permitting rotation in only one direction; and a pneumatic spring operated piston 48 connected to a source of pulsated air by a conduit 49, and having its piston stem 50 positioned to successively engage the teeth of the wheel 46 and rotate it at a predetermined speed exactly corresponding to the release of one of the filter compartments in relation to its neighbors when pulsated air is admitted to the bellows.

The operation of the filter is believed apparent.

The gas to be filtered enters the receiving chamber 12 at the bottom of the filter through an inlet opening therein, passes upwardly into the interior of the filter sleeves in all of the filter compartments except for those in the compartment in which "shaking" is taking place, then passes through the permeable sleeves into the filter compartments, then through the suction conduits 29 of the filter compartments into the lower chamber 18 formed in the central cylindrical chamber 14 of the body 10, from which it is suctioned out through conduit 19 by the suction blower connected thereto.

In the filter compartment positioned to undergo the shaking phase of the operation, as shown in Fig. 2, pulsated air, supplied from a suitable source, passes through pipe line 45 into the chamber 44 in the fixed distributor head 34, then passes into the upper chamber 38 of the tubular member 32, then through pipe 41 into the manifold 25 in the filter compartment and, by alternately expanding and contracting the bellows 26, shake the filter sleeves 28 attached thereto.

During this shaking period, atmospheric air, entering the open upper end of the central cylindrical chamber 14 enters the opening 43 in the tubular member 32 and passes downwardly therethrough into the suction conduit 29 of the filter compartment and into the interior of the filter compartment. The atmospheric air passes through the permeable walls of the filter sleeves and down through the sleeves into the funnel-shaped chamber at the bottom of the filter in which exists a suction created by the suction blower connected to the conduit 19.

After the predetermined interval allowed for the shaking of the sleeves has expired, pulsated air is admitted to the pneumatic cylinder 48 and this cylinder operates to rotate the tubular member 32 to bring it into position to "shake" the next succeeding filter compartment, where a new shaking phase of operation begins.

Figure 5:
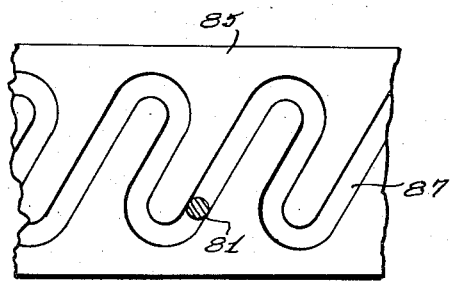
Figs. 5 and 6 are fragmentary diagrammatic side elevational views of the crown member of the distributor assembly shown in Figs. 3 and 4.
Figure 6:
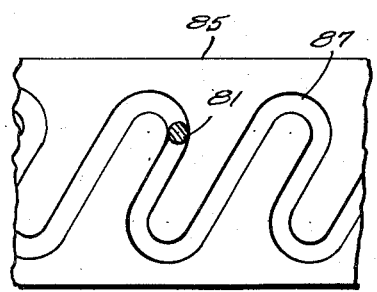

In Figs. 3 to 5, there is illustrated another modification of the invention. In this particular modification, the filter body 10' with its funnel-shaped lower portion 11' forming the receiving chamber 12', and its cylindrical upper portion 13' divided into an open-ended central cylindrical chamber 14' and a closed-ended annular chamber 15'; the transverse partition wall 16' dividing the central cylindrical chamber 14' into an upper chamber 17' open at its top to the atmosphere, and a lower chamber 18' having its open bottom end connected to a conduit 19' extending through the funnel-shaped portion 11' of the body 10' and connected to a suitable suction blower (not shown); the plurality of radial partition walls 20' dividing the annular chamber 15' into a plurality of axially extending filter compartments 21', with each compartment having vertically spaced transverse partitions 22', 23' therein forming the top and bottom walls, respectively, of the compartment and with the bottom wall 23' provided with a plurality of circular openings 24'; the plurality of manifold pipes 25' each extending above the top wall 22' in one of the filter compartments 21' and carrying a plurality of bellows 26' whose top walls are fixedly connected to the manifold pipe by suitable tubular members providing communication therewith, with the manifold pipes having their inner ends closed and their outer inlet ends extending outward into the central cylindrical chamber 14' with their end portions turned up and with their flanged orifices 27' arranged in a circle about the vertical axis of the central cylindrical chamber 14', the filter sleeves 28' and their mounting in the filter compartments 21'; and the suction conduits 29' connected to each filter compartment, are generally similar in construction and arrangement to the corresponding parts of the modification illustrated in Figs. 1 and 2.

In this modification, the distributor assembly, indicated generally at 31', is mounted within the central cylindrical chamber 14' of the body 10' and comprises an upper tubular member 51 and a lower tubular member 52, with the bottom end portion of the upper tubular member telescopically received in the enlarged upper end portion of the lower tubular member to permit vertical sliding movement of the lower tubular member. The two tubular members are connected together for rotation as a unit by means of a pair of opposed lugs 53 fixedly mounted on the upper tubular member and projecting into elongated vertical openings 54 formed in the lower tubular member. A circular seal 55 insures the imperviousness of the duct formed by the two tubular members.

The upper tubular member 51 has an annular chamber 56 formed about its upper end portion and carries a circular laterally extending flange 57 which forms the bottom wall of the annular chamber 56 and is positioned to slidably engage and cover the inlet openings 27' of the manifold pipes 25'. The annular chamber 56 has a pipe 58 connected thereto and carried by the flange 57, with its outer end terminating in a circular opening 59 formed in the flange 57 and positioned to be successively brought into communicative engagement with the inlet openings 27' of the manifold pipes 25' as the distributor assembly is rotated. The upper tubular member 51 is supported by a fixed ball bearing support assembly, indicated generally at 60.

The lower tubular member 52 has its axial bore divided into upper and lower chambers 61, 62, respectively, by a partition wall 63'. The upper chamber 61 has a laterally extending pipe 63 communicating therewith for a purpose hereinafter to be described. The lower chamber 62 has a laterally extending pipe 64 communicating therewith at its upper end and opening into the central cylindrical chamber 14' and thus to the atmosphere, and a laterally extending pipe 65 communicating therewith at its lower end, the pipe 65 having the circular edges 66 of the opening in its upper end positioned to be successively brought into engagement with the circular edges 67 of the orifices formed in the outer ends of the suction conduits 29' as the distributor assembly is rotated.

The lower tubular member 52 is supported by a ball bearing assembly, indicated generally at 68, fixedly mounted on the transverse partition wall 16' formed in the central cylindrical chamber 14'.

A fixed distributor head 69 is mounted upon and connected to the upper end of the upper tubular member 51 and its surrounding annular chamber 56 by suitable bearings. The head 69 has a central duct 70 formed therein with its lower end communicating with the axial bore 71 of the upper tubular member 51 and with its other end connected to a suitable device (not shown) for alternately creating a suction and a pressure within the duct. The head 69 is also provided with an annular chamber 72 surrounding the lower part of the duct 70. The annular chamber 72 communicates with the annular chamber 56 carried by the upper tubular member 51 and is provided with a conduit 73 connected to a suitable source of pulsated air (not shown).

The means for intermittently rotating the distributor assembly to successively bring the pipes 58 and 65 into communication with the manifold pipes 25' and the suction conduits 29', respectively, of the filter compartments, comprises an annular bellows 74 having its movable bottom plate 75 positioned to rest on bosses 76 mounted on the transverse partition wall 16' and its upper fixed plate 77 fixedly connected to the pipes 63 and 64 carried by the lower tubular member 52, and with the pipe 63 communicatively connected to the bellows for exhausting and supplying air thereto; an open-ended cylindrical sheath or member 78 provided with a lateral circular flange fixedly connected to the bottom plate 75 of the bellows and provided, intermediate its ends, with opposed elongated vertical openings 79 and 80, through which the pipes 63 and 64, respectively, project, and at its top portion with opposed laterally projecting stop members 81, 82; and a second open-ended cylindrical sheath or member 83 positioned within the sheath 78 with its bottom end fixedly mounted on the ball bearing assembly 68, through which the lower tubular member 52 extends and with its upper end portion engaging the pipes 63 and 64 when the lower tubular member is moved downwardly, as shown in Fig. 3, to move the pipe 65 out of engagement with the suction conduits 29' of a filter section; a compression spring 84 mounted within the sheath 83 with its bottom end resting on a shoulder formed within the sheath and its upper end engaging the under surface of the pipes 63 and 64 and normally urging these pipes and the lower tubular member 52 to which they are connected, upwardly; a cylindrical member or crown 85 positioned to encircle the upper end portion of the sheath 78 and rotatably supported as by means of a circular ball bearing crown assembly, indicated generally at 86, and fixedly attached to the filter by lugs connected to the manifold pipes 25', and with its internal surface provided with a circumferentially extending helical groove 87 in which are received the stop members 81 and 82 carried by the sheath 78, and provided with an external toothed wheel 88 in which engages a latch member or pawl member 89 which permits rotation of the crown in one direction but opposes rotation thereof in the opposite direction.

The lower tubular member 52, at the point where it passes through the transverse wall 16' dividing the central cylindrical chamber 14' into upper and lower parts, is provided with a circular braking flange 90 with its edge 91 in the form of a truncated conical surface which exactly fits the edge 92 of the opening in the partition wall, thus insuring the imperviousness of this wall and preventing movement of the lower tubular member during the shaking period.

The contacing surfaces of the edges 91 and 92 of the brake flange 90 and the opening in the transverse wall member 16' are preferably coated with a suitable adhering material, as indicated at 93, in order to increase their braking efficiency. Likewise, the contacting surfaces of the rotating pipe 65 and the suction conduits 29' may be coated with adhering material, as indicated at 94. The material employed to coat these surfaces, in addition to its adherence quality, is flexible to increase the efficiency of the sealing action of these surfaces during the shaking period.

In Fig. 5, there is shown a section of the circular crown member 85 with its helical groove 87 and with the stop member 81 shown in its lower position in the groove, the position shown in Fig. 4 and the position it occupies when the distributor assembly is stopped and in position to permit a shaking of one of the filter compartments. Obviously, the other stop member 82 would be in a similar position diametrically opposite the stop 81. Any upward movement of the stop member in the groove would tend to turn the crown member 85 in a counter-clockwise direction, looking down on it from the top; however, such movement is prevented by the latch member 89 engaging the toothed wheel 88 fixedly mounted on the crown member. Accordingly, as the stop member 81 moves upwardly in the groove 87, the sheath 78 would be caused to rotate in a clockwise direction and through an angular degree corresponding to the pitch of the helical groove, the pitch being such as to cause the distributor assembly to be rotated to a position to engage the manifold pipe 25' and the suction conduit 29' of the next succeeding filter compartment.

In Fig. 5, the stop member 81 is shown at the upper position in the groove 87, the position shown in Fig. 3, and the position it occupies when the distributor assembly is at the end of an angular displacement. In this position, the vertical downward movement of the stop member 81 in the groove 87 would cause the crown member 85 to rotate in a clockwise direction and in a degree corresponding to the previous clockwise rotation of the distributor assembly.

The manner in which the distirbutor assembly is operated is as follows:

During the shaking period, the distributor assembly would be in the position shown in Fig. 4. Pulsated air from a suitable source passing through pipe line 73, annular chambers 72 and 56 and pipe line 58 into manifold pipe line 25' in the filter section ready for shaking, would alternately expand and contract the bellows 26' connected to the manifold pipe line and thereby cause the filter sleeve 28' connected to the bellows to expand and contract, shaking the dust therefrom. Also, the flow of air through the filter sleeves would be reversed, the flow being from the atmosphere through pipe line 64 into chamber 62 of the lower tubular member 52, thence through pipe 65 and suction conduit 29' into the filter section being shaken, through the filter sleeves into the interior thereof and down through these sleeves into the compartment in the funnel-shaped section 11 of the chamber 10' which is under suction, thus removing all dust from the interstices of the filter sleeves. The inlets to the manifold pipes 25' of the remaining filter compartments would be closed by the flange 57 carried by the upper tubular member 51 of the distributor assembly.

As soon as the period of shaking has expired, a suction would be created in the annular bellows 74 of the distributor assembly through the duct 70 of the fixed head 69, the bore of the upper tubular member 51, the upper chamber 61 of the lower tubular member 52, and the pipe 63 connecting the bellows to the interior of the chamber 61.

When the bellows 74 is first depressed it exerts, through the intermediary of the sheath 78 and its stops 81 and 82, which are in their lower position, a heavy pressure on the helical grooves 87 in the crown member 85, itself stopped by the latch 89. Owing to the vertical reaction thus taking place downward, the bottom plate 75 of the bellows is held in position; the top plate 77 lowers and carries downward the lower tubular member 52 and with it the pipes 63 and 64, and slightly compresses the spring 84, the tension of which is set to this end. This downward movement of the lower tubular member 52 brings the pipes 63 and 64 into abutment with the lower edges of the elongated vertical slots 79, 80 formed in the sheath 78. During this downward movement of the lower tubular member 52, the edges 91 of the circular flange 90 and the edges of the orifices in the pipes 65 are moved downwardly out of engagement with the edges 92 of the circular opening formed in the transverse wall 16' and the edge 67 of the orifice in the suction pipe 29'. Also, during this movement, the friction between the circular flange 57 and the orifices 27 in the ends of the manifold pipes 25' is sufficient to impress upon the stops 81 and 82 a suitable reaction of grooves 87 to hold the spring 84 compressed. During this downward movement of the lower tubular member 52, as soon as the pipes 63 and 64 engage the lower edge of the openings 79 and 80 in the sheath 78, the downward movement of the top plate 77 of the bellows is stopped and, as the bellows continues its depression, the bottom plate 75 lifts, thereby lifting the sheath 78, and the pressure of the stops 81 and 82 on the edges of the helical grooves 87 causes the lower tubular member 52 to rotate. When the stops 81 and 82 are at the end of their upward movement, the distributor assembly will have rotated through an angle exactly sufficient to place the pipes 58 and 65 in front of the manifold pipe 25' and the suction pipe 29' of the next succeeding filter compartment, in the position shown in Fig. 3. At this movement, suction to the annular bellows 74 is suppressed, the ascending force of the sheath 78 and of its stops 81 and 82 ceases. The spring 84 pushes the lower tubular member 52 upwardly, thereby causing the edges 91 of the circular flange 90 to engage the edges 92 of the opening in the transverse partition plate 16', the edges 66 of the orifice in the pipe 65 to engage the edges 67 of the orifice in the suction conduit 29', effectively braking and stopping the rotary movement of the distributor assembly.

Next, the sheath 78 moves downward, guided by the elongated vertical openings 79 and 80, in which the pipes 63 and 64 respectively slide. This downward movement of the sheath 78 causes the stops 81 and 82 to move downward along a vertical path, thus, by their engagement in the helical groove 87 of the crown member 85, causing the crown member to be rotated in the same direction as the distributor assembly has been rotated and with the same angular displacement. The distributor assembly will have returned to the position illustrated in Fig. 4 and will be in position for a new shaking period.

From the foregoing, it readily will be seen that there has been provided novel and improved apparatus for filtering liquid; one that is particularly adapted to filtering dust-laden gas; and one which provides a single distributor assembly for successively shaking the filter sleeves in the various filter compartments and creating a reverse flow of fluid through the filter sleeves being shaken, the rotating means for the distributor assembly providing a quick traveling movement followed by a stopping period during which the shaking of the sleeves in one compartment takes place.

Obviously, the invention is not restricted to the various embodiments thereof herein shown and described.

What is claimed is:

1. Apparatus for filtering fluids such as dust-laden gas, comprising a plurality of filter compartments arranged in a circle about a common vertical axis; a plurality of elongated flexible permeable filter sleeves mounted in each of said filter compartments; means including conduits for directing a flow of the gas to be treated through said filter sleeves; means mounted in each of said filter compartments for shaking the filter sleeves therein; including a manifold pipe carrying a plurality of bellows, each connected to one of the sleeves; a distributor assembly associated with said filter compartments including a conduit connected to a source of pulsated air and positioned to be successively brought into communicative engagement with said manifold pipes; and means for intermittently rapidly rotating said distributor assembly to bring said conduit into successive engagement with said manifold pipes, so that the bellows carried thereby will be operated to shake the filter sleeves connected thereto.

2. Apparatus as set forth in claim 1, wherein each of said filter compartments has a suction conduit connected thereto and wherein said distributor assembly includes a conduit open at one end to the atmosphere and with its other end positioned to be successively brought into communicative engagement with the suction conduit connected to said compartment as said distributor assembly is rotated, said second named conduit being positioned to engage the suction conduit of a filter compartment when said first named conduit is in engagement with the manifold conduit of the compartment, whereby a reversal of flow of the fluid through the filter sleeves in the filter compartment being shaken will take place.

3. Apparatus for filtering fluids such as dust-laden gas, comprising an upright hollow body having a receiving chamber provided with an inlet opening for the entrance of the gas to be treated formed in its lower end portion and having a central open-ended cylindrical chamber and a closed-ended annular chamber encircling said cylindrical chamber formed in its upper portion above said receiving chamber; a transverse partition wall dividing said central cylindrical chamber into an upper chamber open to the atmosphere and a lower chamber connected to a conduit traversing said receiving chamber and connected to a source of suction; a plurality of radial partitions dividing said annular chamber into a plurality of filter compartments, each having a bottom wall provided with a plurality of openings communicating with said receiving chamber; a plurality of manifold pipes, one extending into each of said filter compartments and having a plurality of bellows fixedly and communicatively connected thereto, said manifold pipes having their inner ends terminating in the upper chamber formed in said central cylindrical chamber and bent upwardly with their inlet orifices arranged in a circle about the vertical axis of said cylindrical chamber, a plurality of elongated flexible permeable filter sleeves having closed upper ends and open bottom ends mounted in each of said filter compartments, each filter sleeve having its bottom end fixedly attached to the bottom wall of the filter compartment, with its axial opening aligned with one of the openings therein and its top wall connected to the movable bottom wall of one of the bellows carried by the manifold pipe in the filter compartment; a plurality of suction conduits each connected to one of said filter compartments and extending into the lower chamber formed in said central cylindrical chamber and having outlet orifices formed in their ends and arranged in a circle about the vertical axis of said central cylindrical chamber; and a distributor assembly mounted in said central cylinder including a pulsated air conduit connected to a source of pulsated air and positioned to be successively brought into communicative engagement with the orifices in said manifold pipes; and means for intermittently rapidly rotating said pulsated air conduit to bring it into successive engagement with said manifold pipes, so that the bellows carried thereby will be operated to shake the filter sleeves connected thereto.

4. Apparatus as set forth in claim 3, wherein said distributor assembly includes a second conduit open to the atmosphere at one end and with its other end positioned to be successively brought into communicative engagement with the outlet orifices in said suction conduits; said second conduit being positioned to engage the suction conduit of a filter compartment when said pulsated air conduit is in engagement with the manifold conduit of the filter compartment, whereby a reversal of flow of fluid through the filter sleeves in the filter compartment will take place.

5. Apparatus as set forth in claim 4, wherein said distributor assembly includes an upright open-ended tubular member divided into an upper chamber and a lower chamber by a transverse wall and mounted in said central cylindrical chamber for rotation about a vertical axis coinciding with the vertical axis of the cylindrical chamber; a fixed distributor head mounted on the upper end of said tubular member and having a chamber therein in communication with the upper chamber formed in said tubular member and a pipe connecting the chamber in said distributor head to a source of pulsated air; wherein said pulsated air conduit is connected to the upper chamber formed in said tubular chamber; and wherein said tubular member projects downwardly through the transverse wall in said central cylindrical chamber and is connected to said second conduit positioned to successively engage said suction conduits; and wherein the lower chamber formed in said tubular chamber has an opening formed therein opening to the atmosphere.

6. Apparatus as set forth in claim 5, including a toothed wheel fixedly mounted on said tubular member, a pawl engaging said toothed wheel for permitting rotation in one direction only; and means including a reciprocal stem member engaging said toothed wheel for intermittently rapidly rotating said wheel and said tubular member.

7. Apparatus as set forth in claim 4, wherein said distributor assembly includes a pair of axially aligned upright tubular members mounted in said central cylindrical chamber for rotation about a vertical axis coinciding with the vertical axis of the cylindrical chamber and with the lower end of the upper tubular member telescopically mounted within the upper end of the lower tubular member to permit up and down movement of the lower tubular member and means connecting the engaged ends of the tubular members to cause them to rotate as a unit; an annular chamber formed about the upper open end of said upper tubular member for rotation therewith and having a closed bottom and an open top, and with said pulsated air conduit connected thereto; a fixed distributor head mounted on the open upper end of said upper tubular member and having an annular chamber formed therein communicating with the annular chamber on said upper tubular member and a pipe connecting the annular chamber in said distributor head to a source of pulsated air; said lower tubular member projecting down through the transverse wall in said central cylindrical chamber and with its bottom end portion closed and connected to said second conduit positioned to successively engage said suction conduits, and wherein said lower tubular member has an opening therein communicating with the atmosphere.

8. Apparatus as set forth in claim 6, wherein the means for intermittently rapidly rotating the distributor assembly includes means for raising and lowering the lower tubular member to move said second conduit into and out of engagement with a suction conduit as the distributor assembly is operated to successively shake the filter sleeves in one of the filter compartments, including an annular bellows fixedly connected to said lower tubular member and a coiled compression spring normally exerting an upward pressure on said lower tubular member.

9. Apparatus as set forth in claim 8, including a braking flange fixedly mounted on said lower tubular member and positioned so that its edges engage the edges of the opening in the transverse wall in said central cylindrical chamber through which said lower tubular member extends when said lower tubular member has been rotated to bring said second conduit in position to engage a suction conduit and said lower tubular member is raised, thereby efficiently braking the rotation of said distributor assembly.

10. Apparatus as set forth in claim 9, wherein the edges of the braking flange and the edges of the opening in the transverse wall engaged thereby are coated with a flexible adherent material to increase the braking and sealing efficiency of the braking flange.

11. Apparatus as set forth in claim 10, wherein the edges of the orifices in said suction conduits and the edges of the orifice in said second conduit are coated with a flexible adherent material to increase the braking of said distributor assembly and the sealing of the connection between said second conduit and the suction conduit engaged thereby.

References Cited in the file of this patent

UNITED STATES PATENTS

| | | |
|---|---|---|
| 1,109,997 | Lob | Sept. 8, 1914 |
| 2,723,726 | Pellon | Nov. 15, 1955 |

FOREIGN PATENTS

| | | |
|---|---|---|
| 441,252 | Germany | Mar. 2, 1927 |
| 606,956 | Germany | Dec. 14, 1934 |
| 781,022 | France | Feb. 18, 1935 |